United States Patent [19]

Bhatti

[11] Patent Number: 4,511,383
[45] Date of Patent: Apr. 16, 1985

[54] METHOD FOR PRODUCING GLASS FIBER

[75] Inventor: Mohinder S. Bhatti, Granville, Ohio

[73] Assignee: Owens-Corning Fiberglas Corporation, Toledo, Ohio

[21] Appl. No.: 513,890

[22] Filed: Jul. 14, 1983

[51] Int. Cl.³ ............................................ C03B 37/085
[52] U.S. Cl. ................................................ 65/6; 65/7; 65/14; 65/15; 65/374.12; 228/174
[58] Field of Search .................... 65/1, 6, 7, 14, 15, 65/24, 374.12; 228/174

[56] References Cited

U.S. PATENT DOCUMENTS 3,031,717  5/1962  Levecque ................................ 65/15
3,312,537  4/1967  Jewell ................................... 65/1 X
4,384,216  9/1982  Bhatti et al. ............................ 65/1

OTHER PUBLICATIONS

Battelle Labs Columbus, O Report #MCIC 7734 Nov. 1977, Hot Isostatic Pressing pp. 31–34, and 55–65.
Electrolizing Cleveland, O Technical Bulletin EP83 Electropolishing.
Effects of Processing on Performance of Cast Prosthesis Alloys Hodge et al., Corrosion Magazine vol. 31, No. 3, pp. 111–112, Mar. 1975.
Electropolishing Van Nostrand's Scientific Encyclopedia 4th Edition, 1968, p. 612.

*Primary Examiner*—Robert Lindsay
*Attorney, Agent, or Firm*—Ronald C. Hudgens; Robert F. Rywalski; Greg Dziegielewski

[57] ABSTRACT

A process for making glass fibers is provided comprising supplying a stream of molten glass to a rotating rotor; discharging said glass through orifices in said rotor as a plurality of primary streams; and attenuating said primary streams into fibers, said spinner being fabricated from a superalloy by a process comprising electropolishing said rotor sufficient to substantially eliminate the "break-in" period otherwise associated with such rotors.

11 Claims, 12 Drawing Figures

METHOD FOR PRODUCING GLASS FIBER

TECHNICAL FIELD

The invention disclosed herein relates to the centrifugal production of glass fibers or filaments by post fabrication treatment of the spinner to improve the physical attributes of the spinner and to improve the quality of the glass filaments produced thereby.

BACKGROUND

The production of glass filaments for use as insulation by the centrifugal or rotory process is well known. Cobolt, nickel, or iron based superalloys can be employed as the material of the rotor, or centrifuge, with cobalt based and nickel based receiving more widespread use because of their superior properties. For example, see U.S. Pat. Nos. 3,933,484, 3,318,694, 3,010,201, 3,980,473, 3,881,918, 3,806,338, 3,984,240 and 4,203,747.

The requirements for the rotor alloys include high temperature strength and creep resistance as well as oxidation resistance and corrosion resistance to molten glass. Unfortunately, the strongest alloys generally exhibit poor corrosion resistance, and the more corrosion resistant alloys are, as a practical matter, limited to service in the fiberization of traditional insulation forming glasses which generally exhibit a low fiberization temperature, i.e., glasses having a liquidus temperature of less than about 1780° F. and a viscosity of about 316 poise at 2190° F. or less.

Further, some of the present rotors exhibit a 20–40 hour (or more) break-in period. During the break-in period, the fibers produced from such spinners are generally brashy and of low quality. Also, an objectionable amount of dust is produced during the break-in period which, along with the low quality fibers, produce a glass wool mat or pack having a lower thermal resistance than that of a dust free, high quality fiber wool pack.

DISCLOSURE OF THE INVENTION

This invention pertains to a method of producing glass fibers wherein the spinner employed in a rotary process is subjected to post fabrication treatments of hot isostatic pressing and/or electropolishing to improve the properties and performance of the rotor and to improve the quality of the glass fibers and glass fiber pack produced therefrom.

BEST MODE OF CARRYING OUT THE INVENTION

Figure 1:
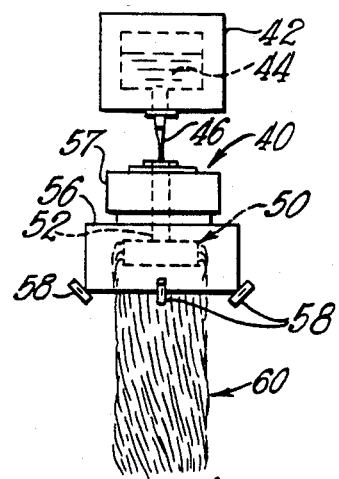
FIG. 1 is a semi-schematic, front elevational view of a rotary fiber-forming system for producing glass wool.
Figure 2:
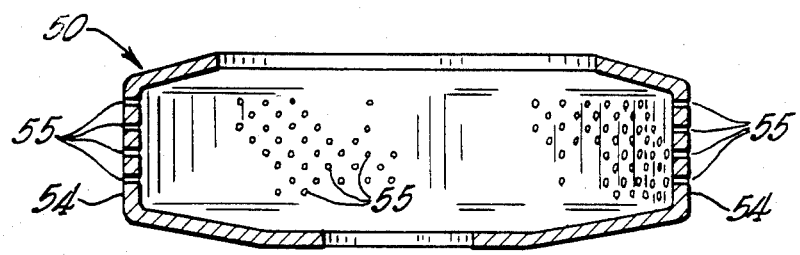
FIG. 2 is an enlarged cross-sectional view of the spinner shown in FIG. 1.

As shown in FIG. 1, rotary or centrifugal fiber-forming system 40 is comprised of a flow means or channel 42 having a body of molten inorganic material 44, such as glass, therein. A stream of molten glass 46 is supplied to the rotor or spinner 50 from channel 42, as is known in the art.

Spinner 50, which is adapted to be rotated at high speeds is comprised of a quill 52 and a circumferential stream defining or working wall 54 having a plurality of orifices 55 therethrough to supply plurality of pre-filament or primary streams of molten and inorganic material to be fiberized. After forming the body of the rotor by any suitable process, such as casting, thousands of holes are formed in the circumferential wall, for example, by electron beam drilling.

In conjunction with rotor 50, a shroud 56 and circumferential blower or fluid attenuation means 57 are adapted to fluidically assist in the attenuation of the streams of molten material into fibers or filaments 60. A binder material or coating may be applied to the fibers 60 by means of binder applicators 58 as is known in the art. The fibers then may be collected as a pack or mat to produce "wool" type glass fiber insulation.

According to the principles of this invention, spinner 50 receives a post-fabrication treatment (i.e., a treatment subsequent to the formation of the thousands of orifices 55 in the circumferential wall 54) of hot isostatic pressing and/or electropolishing to improve the physical properties and performance of the spinner and/or improve the quality of the fibers and wool pack produced therefrom. However, it is to be understood that the alloy may be HIP'd prior to the formation of orifices 55, if desired, to achieve the strengthening of the alloy.

Rotor 50 may be of any of the alloys conventionally employed in a rotary fiber forming process such as a cobolt (Co) based superalloy, or nickel (Ni) based superalloy or iron (Fe) based superalloy which contain carbon and carbide formers. Exemplary carbide formers are tungsten (W), chromium (Cr), vanadium (Va), tantalum (Ta), hafnium (Hf), zirconium (Zr) and titanium (Ti). Desirably, the rotor is a nickel based superalloy or a cobalt based superalloy with the latter being preferred. The HIP treatment of such superalloys provides a mechanically stronger spinner having greater high-temperature service capability than an un-HIP'd spinner of the same alloy composition. With such improved high-temperature service capabilities, HIP treated spinners are capable of fiberizing not only traditional insulation forming glasses but also glasses which are of a higher liquidus temperature and of higher viscosity. The service life of un-HIP'd spinners on such higher liquidus glasses is unacceptably brief.

In addition to the improved rupture strength and improved creep rate, thus providing a mechanically stronger spinner, it has been surprisingly found that diameters of the orifices 55 are rendered more uniform by the HIP treatment. Also, the HIP treatment appears to reduce the rate of orifice wear to prolong rotor life, and to a lesser extent, smooths the orifice walls to provide "smoother or less brashy" filaments immediately upon start-up.

It is believed that the improved high-temperature strength is provided by redistribution of the metallic carbides in the alloys through precipitation hardening. With the simultaneous application of a sufficient amount of heat and pressure during HIP'ing for a sufficient period of time, the metallic carbides precipitate along grain boundaries to provide grain boundary locking to reduce the amount of dislocation movement. Merely heating the rotor does not produce the tight, regular network of precipitated carbides as can be seen in FIG. 4.

Figure 3:
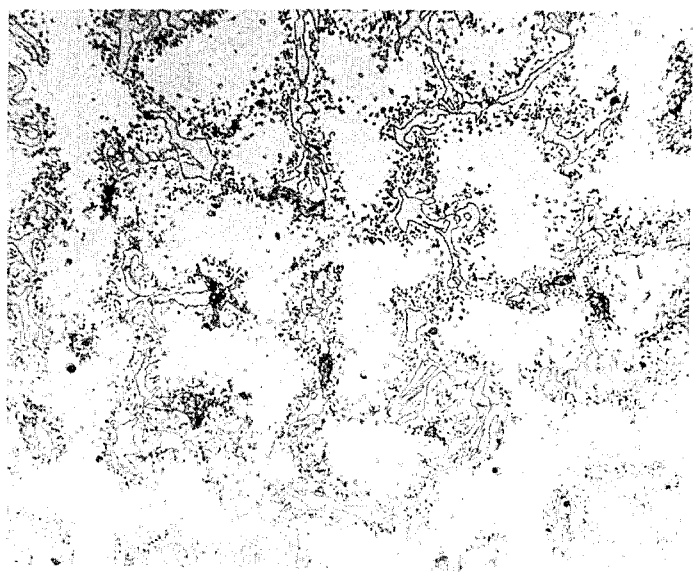
FIG. 3 is a photograph of the microstructure of a cross-section of a standard or "untreated" spinner.
Figure 4:
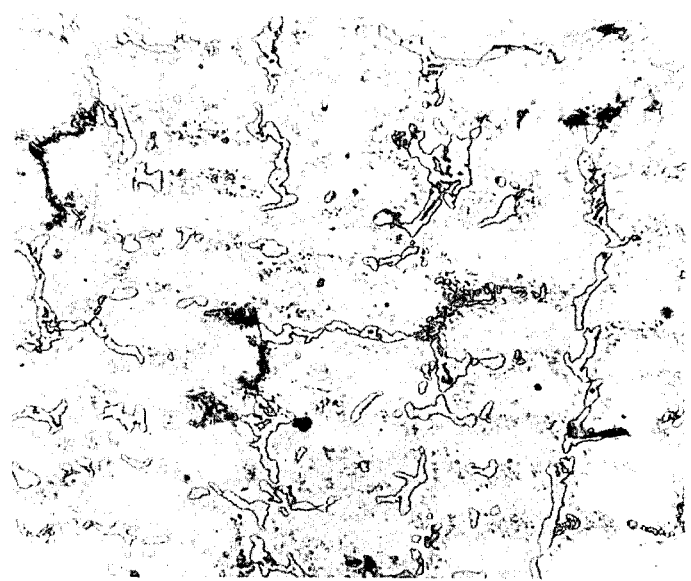
FIG. 4 is a photograph of the microstructure of a spinner of the same alloy composition as that shown in FIG. 3 which has been treated by hot isostatic pressing (HIP) according to the principles of this invention.

FIGS. 3 and 4 are photos of enlarged cross-sections of spinners fabricated from a cobalt based superalloy containing about 45% cobalt (Co), 31% chromium (Cr), 12% nickel (Ni) and containing lesser amounts of tungsten (W), tantalum (Ta), carbon (C), silicon (Si), zirconium (Zr), and boron (B). FIG. 3 shows the microstructure of an unused and un-HIP'd spinner of such an alloy, and FIG. 4 shows the microstructure of an unused spinner after HIP treatment at 2200° F. and 15,000 psi for two hours. Clearly, a metallurgical change has taken place as a result of the HIP treatment sufficient to increase the mechanical strength and high-temperature service capability of the rotor 50. In general, the pressure applied during the HIP'ing treatment should be greater than the yield strength of the material at that temperature to render the orifices in the rotor wall more uniform and to provide the strength improvement in the material itself.

Regarding the HIP treatment, temperatures within the range from about 2000° to 2200° F. pressures within the range from about 10,000 to about 30,000 psi, and times of about 1 to about 4 hours are exemplary to produce the metallurgical changes and orifice uniformity improvement heretofore discussed. A HIP temperature of 2150° F., pressure of 15,000 psi for a period of two hours was employed on a number of spinners to produce the results shown in FIGS. 4, 6 and 8 for the aforementioned cobalt based alloy. At the end of the HIP treatment cycle, the HIP chamber is purged of its working fluid, usually an inert gas such as argon, and the oxygen containing atmosphere is permitted to enter the HIP chamber. Since the spinners are still extremely hot, it is believed the oxygen in the air reacts with the surface of the alloy to form a thin metallic oxide coating thereon, including the walls of the orifices themselves. For example, for the aforementioned cobalt base alloy, which contains Cr, an oxide of Cr is believed formed, which is less susceptible to the corrosive attack of the molten glass.

Figure 5:
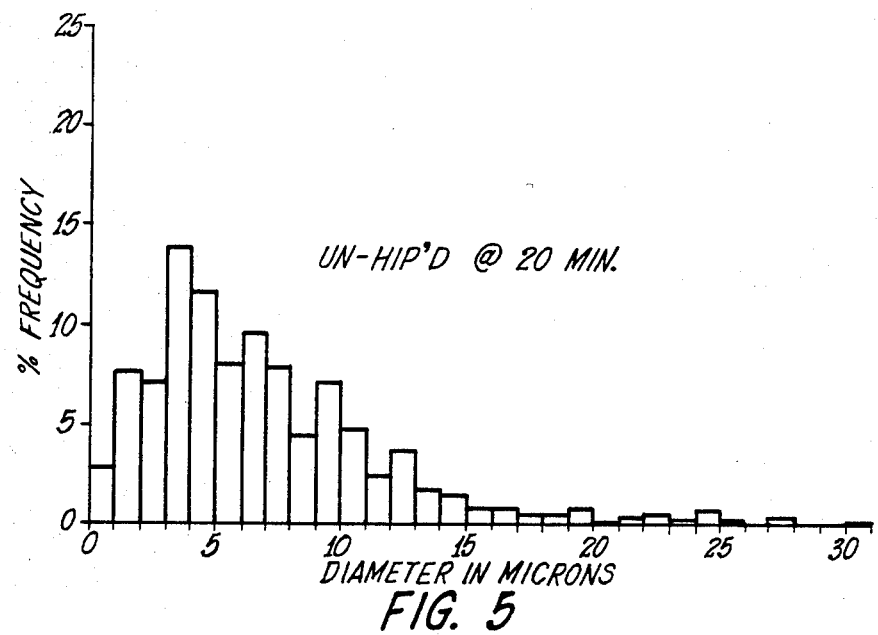
FIG. 5 is a histogram of the fiber diameter distribution produced on a standard spinner after 20 minutes of operation.
Figure 6:
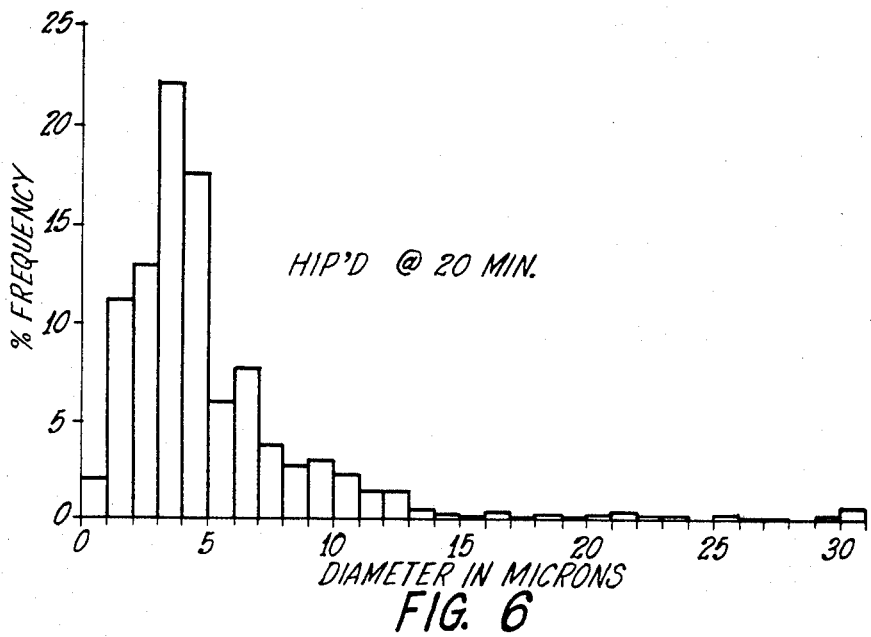
FIG. 6 is a histogram of the fiber diameter distribution produced by spinner receiving a HIP treatment according to the principles of this invention after 20 minutes of operation.

Regarding the increase in uniformity of the orificed diameters, FIGS. 5 and 6 show the percent frequency distribution of filaments produced, from traditional insulation forming glasses, after 20 minutes of operation from HIP'd and un-HIP'd spinners of the aforementioned cobalt based superalloy.

FIG. 5 shows the fiber diameter distribution produced from the untreated spinner. Analysis indicates that the mean fiber diameter collected was 5.9 microns, and the standard deviation therefrom was 4.8 microns. The fiber diameter distribution of the HIP treated spinner is shown in FIG. 6, with a mean fiber diameter of 4.1 microns, and a standard deviation therefrom of 4.3 microns. With each of these spinners being fabricated essentially identical to one another, with the exception of the HIP treatment, it can be seen that the diameter of the fibers produced from the HIP'd spinners are more uniform than the un-HIP'd spinners.

Figure 7:
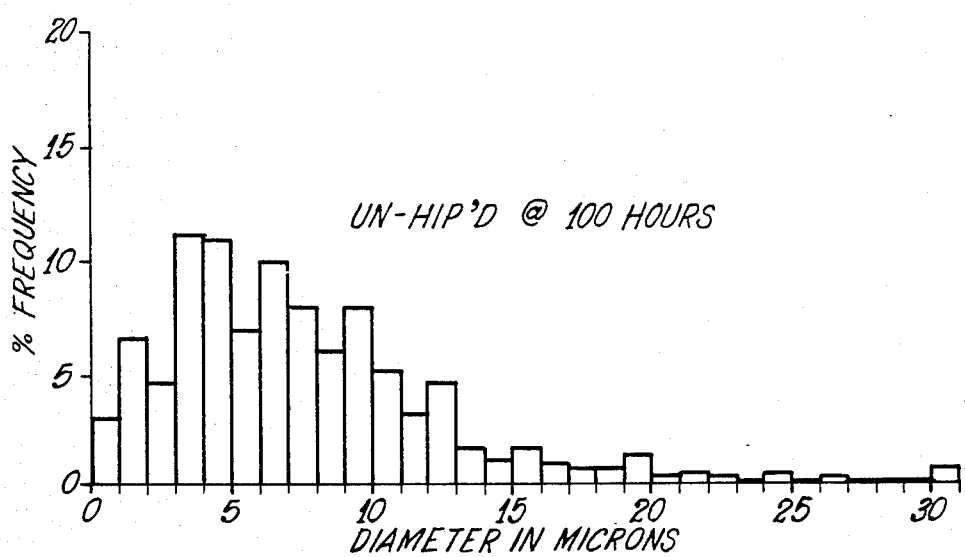
FIG. 7 is a histogram of the fiber diameter distribution produced on a standard spinner after 100 hours of operation.
Figure 8:
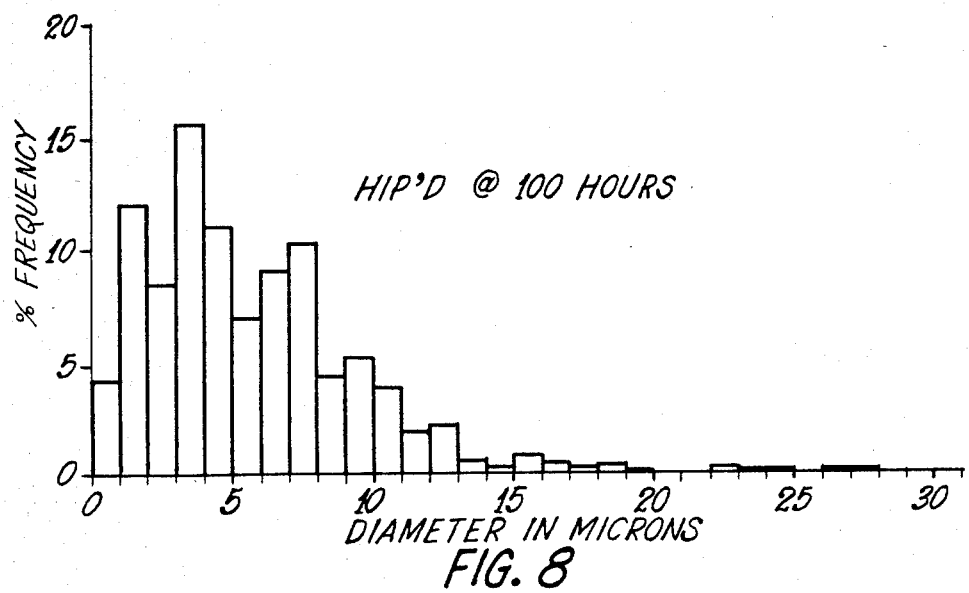
FIG. 8 is a histogram of the fiber diameter distribution produced by spinner receiving a HIP treatment after 100 hours of operation.

FIGS. 7 and 8 are similar percent frequency histograms of the fiber diameters produced by HIP'd and un-HIP'd spinners after 100 hours of operation employing traditional insulation forming glasses. FIG. 7, shows the fiber distribution produced from standard or un-HIP'd spinner of the aforementioned cobalt base super alloy. The fibers produced therefrom had a mean fiber diameter of 7.64 microns with a standard deviation of 5.13 microns.

FIG. 8 shows the fiber distribution of filaments produced on a substantially identical spinner to that represented in FIG. 7, with the exception of a post-fabrication HIP treatment according to the principles of this invention. The fibers produced therefrom had a mean diameter of 5.69 microns with a standard deviation of 3.75 microns. Once again, the diameter of the fibers produced by the HIP'd spinner are more uniform than the fibers produced on the untreated spinner.

Further, measurements of orifice diameters taken at selected sections along a spinner wall before and after HIP treatment also show that the hole diameters are rendered more uniform as a result of the HIP treatment. Also, orifice diameters were rendered smaller after HIP'ing from about 0.0" (i.e., no change) to about 0.001", with an average orifice diameter decrease of about 3% being observed. Thus, it is believed that fibers having a narrower diameter distribution are produced as represented in the comparisons provided in FIGS. 5 through 8. It is also interesting to note that the HIP treated spinners produced fewer larger diameter filaments which accounts in part, at least, for the reduction in the mean fiber diameter for such spinners.

Rupture tests conducted on test samples of the aforementioned cobalt based super alloy also show surprising improvements in critical properties for spinner materials. Specimens of un-HIP'd and HIP'd cobalt based super alloys were individually placed under a tensile load of 3,000 psi at a temperature of 2,100° F. and held there until the specimen ruptured. The standard or un-HIP'd specimens had a life of about 32 hours, whereas the HIP treated specimens had a life of about 70 hours. The untreated specimens had a rupture ductility of about 4.2 percent whereas the HIP treated specimens had a rupture ductility of about 6.7 percent. Further, the untreated specimens had a creep rate of $6.6 \times 10^{-4}$ inch per inch per hour whereas the HIP treated specimens had a creep rate of $4.2 \times 10^{-4}$ inch per inch per hour.

Further comparisons between un-HIP'd and HIP'd spinners indicate that after 180 hours of operation on traditional insulation forming glasses, the HIP treated spinners had approximately an 18 percent reduction in hole wear as compared to the standard or un-HIP'd spinners of the aforementioned cobalt base superalloy. Such a reduction in hole wear may be based in part on the toughening of the metal itself and in part based upon the formation of an oxide coating on the alloy surface as a result of the HIP treatment process as discussed previously herein.

Surprisingly, the k-value or thermal conductance of the insulation pack produced by the HIP treated spinner is lower than that produced by the un-HIP'd spinner. An explanation may be found in the fact that for the HIP'd spinner the fiber distribution parameter or $\gamma$ (which actually is the standard deviation from the mean fiber diameter) has a lower value. This reduces the equivalent radiation conductivity k rad for the pack.

$$\frac{1}{k \text{ rad}} = \frac{A\rho\phi}{\phi^2 + \gamma^2} + B$$

where
A, B are constants
$\rho$ is the pack density
$\phi$ is the mean fiber diameter
$\gamma$ is the fiber distribution parameter FIGS. 5 through 8 clearly indicate that for the HIP'd spinner, $\gamma$ has a lower value.

The use of electropolishing as a post-fabrication treatment (i.e., after the orifices 55 are formed in rotor 50) has been shown to (a) virtually eliminate any break-in period normally associated with such spinners and to (b) provide a glass fiber pack of improved quality.

Electropolishing, which is the opposite of the electroplating process, is particularly effective since electropolishing preferentially attacks or dissolves the sharp edges or discontinuities in the orifices or at the edges of the orifices, which occur as a result of the orifice formation process.

A spinner composed of the aforementioned cobalt base superalloy having a preselected number of orifices formed therein, was placed in a polyethylene electrolytic cell having a stainless steel cathode ring and a stainless steel anode disk in contact with the spinner, thus making the spinner the anode, in the electrolytic circuit. The electrolytic cell was suitably filled with an electrolyte composition of 75.76 percent (by volume) methonol, 15.15 percent phosphoric acid ($H_3PO_4$), and 9.09 percent sulfuric acid ($H_2SO_4$), and energized to suitably polish the orifices of the spinner. Current density is desirably held within the range from about 0.11 amps/$cm^2$ to about 0.14 amp/$cm^2$ for about 30 minutes. Typically, times may vary, but they usually fall within the range from about 10 minutes to about 50 minutes for suitable polishing to take place.

As a preparatory step to the electropolishing treatment itself, the spinner should be thoroughly cleaned of any residue and/or foreign material by means of solvent washing and/or vapor honing and the like to achieve the maximum electropolishing rate.

At fiberization start-up, the electropolished spinners immediately began producing glass fibers having a surface smoothness or texture similar to that produced by seasoned spinners, without the electropolishing treatment. It is known that new standard or untreated spinners generally produce mats of glass fibers having a brashy feel. Such an undesirable brashy feel dissipates as the spinner is seasoned during operation. In addition, the electropolished spinners produced a pack of fibers that has a significantly reduced dust content as compared to unpolished, new spinners.

Figure 9:
FIG. 9 is a photograph of a portion of a pack of glass fibers produced on a standard or untreated spinner after 15 minutes of operation.

FIG. 9 is a photo of a mat or pack of glass fibers produced from a standard or untreated spinner after 15 minutes of operation. It is clear that there are a number of ultrafine fibers in the pack, a number of which are fused or bonded to the surface of the larger diameter fibers.

Figure 10:
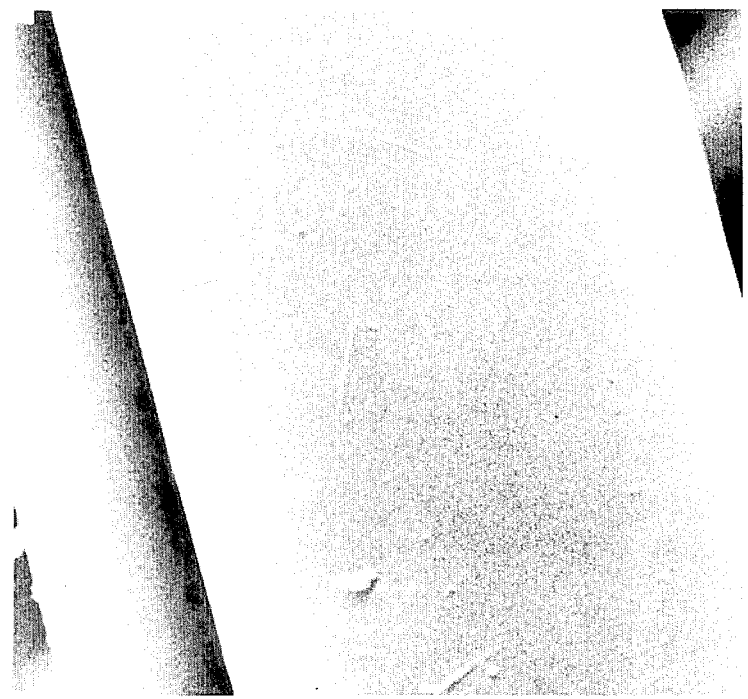
FIG. 10 is a photograph of a portion of a mat or pack of glass fibers produced on an electropolished spinner according to the principles of this invention after 15 minutes of operation.

FIG. 10 is an enlarged photo of a pack of glass fibers produced on a spinner after receiving the post fabrication electropolishing treatment. Clearly, the number of ultrafine filaments is substantially reduced.

Regarding the spinners associated with FIGS. 9-12, such spinners were of the aforementioned cobalt-based superalloy, and the photos and histograms are based upon samples taken approximately after 15 minutes of operation.

Figure 11:
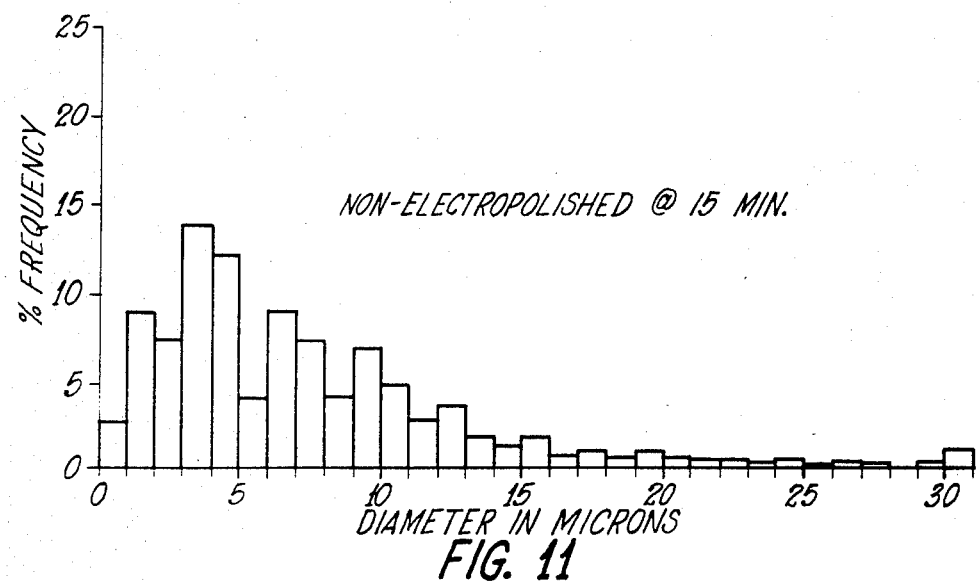
FIG. 11 is a histogram of the fiber diameter distribution produced on a standard spinner after 15 minutes of operation.
Figure 12:
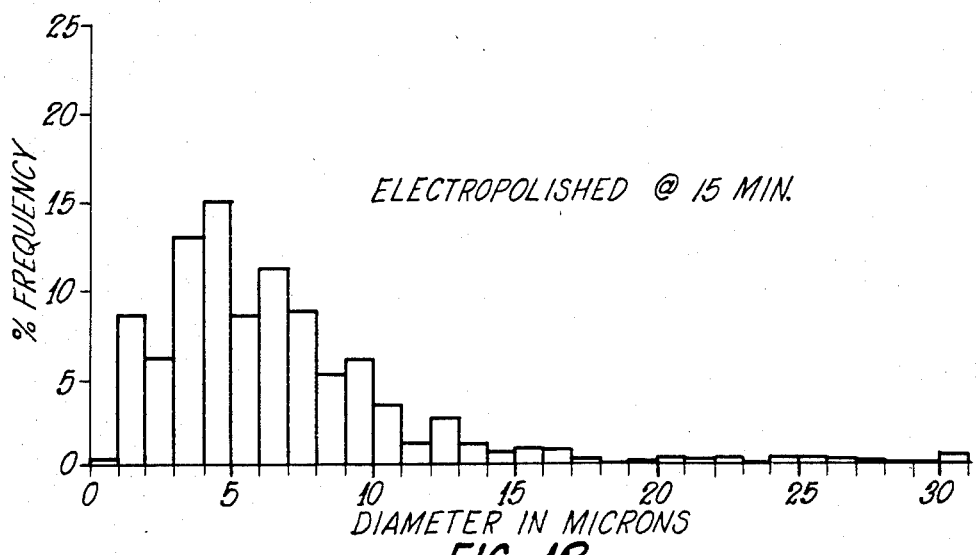
FIG. 12 is a histogram of the fiber diameter distribution produced by a spinner receiving an electropolishing treatment according to the principles of this invention after 15 minutes of operation.

FIG. 11 is a histogram of the percent frequency distribution of the filament diameters produced by standard or untreated spinner, and FIG. 12 is a histogram of the percent frequency distribution of the filament diameters produced by an electropolished spinner according to the principles of this invention. As can be seen therein, the percentage of the fibers having a diameter of 1 micron or less, (i.e. those in the submicron range) are substantially reduced. Also, the number of filaments in the range from 0 to 3 microns are also substantially reduced.

Analysis of the samples from the standard spinner indicates the fibers exhibited a mean diameter of 7.4 microns and a standard deviation therefrom of 5.62 microns. The fibers produced from the electropolished spinner exhibited a mean filament diameter of 6.94 microns with a standard deviation therefrom of 5.04 microns.

With regard to the number of filaments in the submicron range, or those filaments having a diameter of 1 micron or less, an analysis of product samples indicates that the standard spinners produce a wool pack having submicron filaments which comprise from about 2 to about 4.4 percent of the mat or pack. The electropolished spinners, however, produced a pack of glass fibers having from about 0.4 to about 2.8 percent filaments in the submicron range.

Additionally, the standard spinner produced a pack of glass fibers having from about 18.8 to about 27.3 percent filaments having a diameter of 3 microns or less. The electropolished spinner produced a pack of glass fibers having from about 15.3 to about 25.2 percent filaments having a diameter of 3 microns or less.

With the reduction of the percentage of ultrafine filaments, and, more importantly, those in the submicron range, the pack does not exhibit the same brashy feel to the touch as exhibited by the untreated spinner at startup. Further, the reduction of the ultrafine and submicron diameter filaments contributes in large part to the reduction in the "dust" produced by untreated spinners.

Thus, the quality of the glass filaments and pack produced from such spinners is surprisingly and significantly improved by the application of an electropolishing treatment to the fabricated spinner prior to operation of the spinner for the production of fibers.

As a result of the smooth, high-quality fibers and the reduced dust content, the k-value of the insulation pack is also decreased since the fiber distribution parameter is decreased as a result of the electropolishing treatment.

Thus, the thermal resistance of the pack increased as compared to a pack produced employing non-electropolished spinners.

The hot isostatic pressing treatment and the electropolishing treatment may be used alone or desirably in combination with one another to achieve the various benefits noted herein. When combining the hot isostatic pressing with the electropolishing treatment, it is preferred that the electropolishing treatment precede the HIP'ing treatment for maximum benefit. Otherwise, the surface discontinuities and sharp edges may be more difficult to remove by electropolishing if the HIP'ing treatment precedes the electropolishing treatment.

It is apparant that, within the scope of the present invention, modifications of different arrangements can be made other than as herein disclosed. The present disclosure is merely illustrative with the invention comprehending all variations thereof.

INDUSTRIAL APPLICABILITY

The invention described herein is readily applicable to the glass fiber industry.

I claim:

1. In a method of making glass fibers comprising; supplying a stream of molten glass to a rotating rotor; discharging said glass through orifices in said rotor as a plurality of primary streams; and attenuating said primary streams into fibers, the improvement comprising electropolishing said rotor sufficient to substantially reduce the percentage of ultrafine fibers produced therefrom.

2. The method of claim 1 wherein the orifices are formed in said rotor by electron beam drilling and wherein said electropolishing preferentially at least partially dissolves the sharp edges and splatter in the orifices produced by such drilling.

3. The method of claim 1 wherein the number of ultrafine filaments fused to larger diameter filaments at start-up of fiberization is reduced as compared to a non-electropolished rotor.

4. The method of claim 1 further comprising collecting said fibers as a pack, wherein said electropolishing is effective to increase the thermal resistance of the pack of glass fibers produced therefrom.

5. In a method of making glass fibers comprising: supplying a stream of molten glass to a rotating rotor; discharging said glass through orifices in said rotor as a plurality of primary streams; and attenuating said primary streams into fibers, the improvement comprising:
forming said rotor according to a method comprising:
forming a body having a circumferential wall,
forming orifices in said circumferential wall adapted to discharge molten glass therethrough, electropolishing said orificed circumferential wall sufficient to substantially reduce the percentage of ultrafine fibers produced therefrom.

6. The method of claim 5 further comprising, subsequent to the formation of said orifices, hot isostatically pressing said body sufficient to substantially increase the high temperature service capability of the body, said body being comprised of a superalloy material.

7. The method of claim 6 wherein said hot isostatic pressing treatment is effective to reduce the diameter of the orifices and to render the orifices more uniform to increase the uniformity of the diameters of the glass filaments produced therefrom as compared to an untreated rotor.

8. The method of claim 1 further comprising hot isostatic pressing said orificed rotor sufficient to reduce the thermal conductance of an insulation pack of filaments produced by said rotor as compared to a pack of filaments produced by a non hot isostatically pressed rotor.

9. The method of claim 6 wherein said superalloy material is a carbon containing superalloy selected from the group consisting of cobolt, nickel and iron based alloys and wherein said superalloy also includes carbide formers.

10. The method of claim 9 wherein the temperature and pressure of the hot isostatic pressing are sufficient to affect the redistribution of the metallic carbides in the alloys through precipitation hardening to provide grain boundary locking.

11. The method of claim 5 wherein said electropolishing step is carried out subsequent to said hot isostatic pressing step.

* * * * *